United States Patent [19]  
Tanaka et al.

[11] 4,325,838  
[45] Apr. 20, 1982

[54] CATALYSTS FOR POLYMERIZATION OF OLEFINS

[75] Inventors: Hideyuki Tanaka; Yoshihisa Moriya; Kiyotaka Saito; Shozo Hori; Yutaka Mitsuda, all of Machida, Japan

[73] Assignee: Denki Kagaku Kogyo Kabushiki Kaisha, Tokyo, Japan

[21] Appl. No.: 203,080

[22] Filed: Oct. 31, 1980

[30] Foreign Application Priority Data

Oct. 31, 1979 [JP] Japan .................................. 54-139881

[51] Int. Cl.$^3$ ............................ C08F 4/64; C08F 4/02
[52] U.S. Cl. .................................. 252/429 B; 526/125
[58] Field of Search ....................................... 252/429 B

[56] References Cited

U.S. PATENT DOCUMENTS 4,146,502  3/1979  Yokoyama et al. .............. 252/429 B
4,180,636  12/1979 Hirota et al. ................. 252/429 B X Primary Examiner—Patrick Garvin
Attorney, Agent, or Firm—Sughrue, Mion, Zinn, Macpeak & Seas

[57] ABSTRACT

A solid catalyst for olefin polymerization is obtained by treating magnesium halide with halogen or a halogen compound and further treating with an electron donative compound and a halogen-containing titanium compound. The halogen atom of the halogen or halogen compound as the treating agent must be different from the halogen atom of magnesium halide as the substrate.

This solid catalyst is used for a catalytic system for olefin polymerization in combination with an organometallic compound.

12 Claims, No Drawings

CATALYSTS FOR POLYMERIZATION OF OLEFINS

BACKGROUND OF THE INVENTION

This invention relates to a catalytic component for polymerization of olefins and a catalyst system using same.

Ziegler-Natta catalysts of various types are known as a catalyst for polymerization of olefins. With use of these catalysts olefin polymers of stereospecificity are obtained, however, yield per titanium catalytic component, i.e. polymerization activity is still low and also, it is necessary to remove catalytic residues from polymers obtained. Processes for improving these disadvantages are disclosed in, for example, Japanese Pat. No. 52-39431 and Japanese Patent Kokai No. 52-151691.

However, these processes are not yet satisfied in polymerization activity and stereospecificity so that a considerable amount of amorphous polymers and catalytic residues is involved in polymers obtained.

SUMMARY OF THE INVENTION

An object of this invention is to provide a catalytic component for olefin polymerization and a catalytic system using same, improved in polymerization activity and stereospecificity.

In accordance with this invention, there is provided a catalytic component for olefin polymerization which comprises treating magnesium halide as a substrate with at least one member selected from the group of halogen, magnesium halide and an interhalogen compound of the following formula, the halogen atoms of which are different from the halogen of said magnesium halide as a substrate and further treating with an electron donative compound and a halogen-containing titanium compound:

$$XY_n$$

wherein X and Y are different halogen atoms and n is a number of 1, 3, 5 or 7.

Also, in accordance with this invention, there is provided a catalytic system for olefin polymerization comprising the above-mentioned catalytic component and an organometallic compound containing a metal of Groups 1, 2 or 3 of the Periodic Table.

DETAILED DESCRIPTION OF THE INVENTION

Magnesium halide which may be used as a substrate in this invention is selected from the group consisting of $MgCl_2$, $MgBr_2$ and $MgI_2$.

At least one member selected from the group of halogen, magnesium halide and an interhalogen compound is used as a treating agent. Examples of the treating agent are $Cl_2$, $Br_2$ and $I_2$ for the halogen; $MgCl_2$, $MgClBr$, $MgClI$, $MgBr_2$, $MgBrI$ and $MgI_2$ for the magnesium halide; ClF, BrF, IF, BrCl, ICl, IBr, $BrF_3$, $IF_3$, $ICl_3$, $BrF_5$, $IF_5$ and $IF_7$ for the interhalogen compound of the formula, $XY_n$ wherein X, Y and n are as defined above.

The halogen atoms of the treating agent must be different from the halogen atom of the magnesium halide as the substrate. The treating agent may be used in mixtue of two or more. In case of using typical $MgCl_2$ as the magnesium halide, it is preferred that the treating agent is selected from $I_2$, IBr, ICl and $ICl_3$.

The electron donative compound which may be used in this invention is compounds capable of forming a complex compound by reaction with a halogen-containing titanium compound. Examples of these compounds include amines, amides, ethers, esters, ketones, phosphines, phosphoramides, thioethers, thioesters, alcoholates, sulfoxides, sulfonates, sulfones, sulfinates and others.

In the light of the catalytic activity and stereospecificity the electron donative agent is preferably, esters of an organic acid and more preferably, aromatic carboxylic acid esters, examples of which are ethyl benzoate, ethyl o-chlorobenzoate, ethyl p-methoxybenzoate, ethyl p-ethoxybenzoate, toluic acid ethyl ester and isobutyl benzoate. The electron donative compound may be used in mixture of two or more.

Particularly, aromatic esters such as ethyl benzoate, ethyl p-methoxybenzoate and ethyl α-naphthoate are preferred.

A halogen-containing titanium compound which may be used in this invention is, for example, $TiCl_4$, $TiBr_4$, $TiI_4$, $TiCl_3$, $TiBr_3$, $TiI_3$, $Ti(OCH_3)Cl_3$, $Ti(OCH_3)_2Cl_2$, $Ti(OC_2H_5)Cl_3$, $Ti(OC_2H_5)_2Cl_2$, $Ti(OC_3H_7)Cl_3$, $Ti(OC_3H_7)_2Cl_2$ and $Ti(OC_4H_9)Cl_3$. These compounds may be used alone or in mixture of two or more.

Particularly, $TiCl_3$ and $TiCl_4$ are preferred.

Next, the procedure for preparing the catalyst from the above-mentioned components is explained in detail.

First, magnesium halide is treated in, for example, the following manner:

(i) Mixtures or adducts of magnesium halide with the treating agent are pulverized in the presence or in the absence of an inert gas by means of a ball mill, a rod mill, a vibration mill or impact mill. $SiCl_4$, $CCl_4$, 1,2-dichloroethane, hexane or toluene may be added for assisting the pulverization;

(ii) A powdery magnesium halide which has been preliminarily prepared, for example by pulverization is treated with the treating agent in a solvent such as hexane, heptane, carbon tetrachloride, 1,2-dichloroethane and toluene; or (iii) A powdery magnesium halide is contacted with the treating agent in vapour phase. The mole ratio of magnesium halide to the treating agent is within the range of 1:0.01–5, preferably 1:0.05–1.

Preferably, the treating time is comprised between 3 minutes and 300 hours and the temperature between −78° and 500° C.

The magnesium halide treated thus may be used in the next step i.e treatment steps with an electron donative compound and a halogen-containing titanium compound. If desired, an excess of the treating agent is removed by washing with an inert solvent such as hexane, heptane, carbon tetrachloride, 1,2-dichloroethane and toluene or vapourizing under reduced pressure.

The treated magnesium halide is subject to the treatment with electron donative compound followed by the treatment with halogen-containing titanium compound whereby desired catalytic component is obtained.

Alternatively, after having conducted the titanium compound treatment the electron donative compound treatment may be effected, or the electron donative compound treatment may be effected simultaneously with the titanium compound treatment.

The electron donative compound treatment is usually effected in an inert solvent such as hexane, heptane, kerosene, cyclohexane, benzene, toluene, carbon tetrachloride and 1,2-dichloroethane. The inert solvent is used in an arbitrary amount for the purpose of assisting diffusion of the electron donative compound.

An amount of the electron donative compound used is within the range of 0.1–2000 millimols, preferably 0.5–700 millimols based on 1.0 gram atom of Mg of magnesium halide. The treatment time of 3 minutes to 300 hours and the temperature of −20° to 150° C. are preferred.

The magnesium halide treated with the electron donative compound is used in the treatment step with a halogen-containing titanium compound. If desired, an excess of the electron donative compound may be removed by washing with an inert solvent such as mentioned above or vapourizing under reduced pressure.

The titanium compound treatment may be carried out in vapour phase or liquid phase.

The halogen-containing titanium compound, in case of liquid, is used as it is or in mixture with an arbitrary amount of an inert solvent and in case of solid, used by adding an electron donative compound, halogen or an interhalogen compound and dissolving in an organic solvent such as 1,2-dichloroethane, i-amylether, hexane and toluene. An amount of the titanium compound used may be within the range of 0.1 milligram atom–30 gram atoms based on 1.0 gram atom of Mg of magnesium halide.

The treatment time is between 3 minutes and 300 hours, and the treatment temperature is within the range of −20° to 200° C., preferably 20° to 130° C.

After the treatment a free halogen-containing titanium compound or complex compounds thereof, if desired, are removed by washing with an inert solvent.

The solid catalyst thus obtained is a catalyst for olefin polymerization of this invention, in which the titanium content is within the range of 0.05–12% by weight, preferably 0.3–8% by weight.

A catalytic system for olefin polymerization is obtained by combining the solid catalytic component of this invention with an organometallic compound containing a metal of Groups 1, 2 or 3 of the Periodic Table.

The organometallic compound is, for example, compounds having the formula,

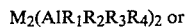

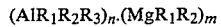

wherein $M_1$ is an alkali metal, $M_2$ is an alkaline earth metal, $R_1$ is an aryl group, alkyl group or alcoholate having 1–10 carbon atoms, $R_2$, $R_3$ and $R_4$ each is hydrogen atom, a halogen atom or an aryl group, alkyl group or alcoholate group having 1–10 carbon atoms, and n and m are a number such that the m/n ratio is about 0.2–8, for example, $Li[Al(CH_3)_3H]$, $Li[Al(OCH_3)(CH_3)_3]$, $Li[Al(CH_3)_4]$, $Li[Al(C_2H_5)_3H]$, $Li[Al(OC_2H_5)(C_2H_5)_3]$, $Li[Al(C_2H_5)_4]$, $Na[Al(CH_3)_3H]$, $Na[Al(OCH_3)(CH_3)_3]$, $Na[Al(CH_3)_4]$, $Na[Al(C_2H_5)_3H]$, $Na[Al(C_2H_5)_2ClH]$, $Na[Al(C_2H_5)_3Cl]$, $Na[Al(OC_2H_5)(C_2H_5)_3]$, $Na[Al(C_2H_5)_4]$, $Na[Al(C_3H_7)_3H]$, $Na[Al(C_3H_7)_2ClH]$, $Na[Al(C_3H_7)_3Cl]$, $Na[Al(OC_3H_7)(C_3H_7)_3]$, $Na[Al(C_3H_7)_4]$, $Na[Al(C_4H_9)_3H]$, $Na[Al(C_4H_9)_2ClH]$, $Na[Al(C_4H_9)_3Cl]$, $Na[Al(OC_4H_9)(C_4H_9)_3]$, $Na[Al(C_4H_9)_4]$, $K[Al(CH_3)_3H]$, $K[Al(CH_3)Cl]$, $K[Al(OCH_3)(CH_3)_3]$, $K[Al(CH_3)_4]$, $K[Al(C_2H_5)_3H]$, $K[Al(C_2H_5)_2H_2]$, $K[Al(C_2H_5)_3Cl]$, $K[Al(OC_2H_5)(C_2H_5)_3]$, $K[Al(C_2H_5)_4]$, $K[Al(C_3H_7)_4]$, $K[Al(C_4H_9)_3H]$, $K[Al(C_4H_9)Cl]$, $K[Al(OC_4H_9)(C_4H_9)_3]$, $K[Al(C_4H_9)_4]$, $Mg[Al(C_2H_5)_3H]_2$, $Mg[Al(C_2H_5)_2ClH]_2$, $Mg[Al(C_2H_5)_3Cl]_2$, $Mg[Al(C_2H_5)_4]_2$, $Ca[Al(C_2H_5)_3H]_2$, $Ca[Al(C_2H_5)_3Cl]_2$, $Ca[Al(C_2H_5)_4]_2$, $Sr[Al(C_2H_5)_3H]_2$, $Sr[Al(C_2H_5)_3Cl]_2$, $Sr[Al(C_2H_5)_4]_2$, $Ba[Al(C_2H_5)_3H]_2$, $Ba[Al(C_2H_5)_3Cl]_2$ and $Ba[Al(C_2H_5)_4]_2$; alkyl aluminum compounds, for example, trialkyl aluminum, alkyl aluminum alkoxides, alkyl aluminum halides and alkyl aluminum alkoxyhalides; alkyl zinc compounds, for example, dialkyl zinc; alkyl magnesium compounds.

The organometallic compound may be used alone or in mixture of two or more. Further, the organometallic compound may be used in combination with an electron donative compound wherein a complex compound is partially or wholly formed. Also, such a complex compound may be used in mixture with the organometallic compound. An amount of the organometallic compound used is within the range of 0.01–500 mols, preferably 0.5–50 mols based on 1 mol of titanium atom of the solid catalyst. The solid catalyst and the organometallic compound may be added simultaneously or separately. Also, the addition may be conducted at once, divided in parts or continuously.

Olefins which are polymerized using the catalyst of this invention are, for example, ethylene, propylene, 1-butene, 1-pentene, 1-hexen and 4-methyl-pentene. Homopolymerization of these monomers or random or block copolymerization of monomers of two or more can be carried out. Also, other polymerizable compounds may be used as the copolymerizable monomer.

The polymerization may be carried out in vapour phase or in liquid phase in which an inert solvent such as hexane, heptane and kerosene is used as a reaction medium or olefin monomers themselves may be used as the medium. A molecular weight of polyolefin is controlled by, for example hydrogen.

The polymerization temperature is not particularly limited, though it is between 0° and 150° C., preferably 40° and 80° C. The polymerization pressure is, preferably between 1 and 150 Kg/cm², but not particularly limited. The polymerization may be effected under batch, semi-continuation or continuation system in one step having the same polymerization conditions or divided to steps of two or more having different polymerization conditions.

This invention will be illustrated by the following non-limitative examples.

EXAMPLE 1

Preparation of Solid Catalyst 45 g of a commercially available anhydrous magnesium chloride and 6 g of iodine were charged to a stainless steel ball mill pot of 2.5 l in capacity and 145 mm in diameter containing 400 balls of stainless steel having a diameter of 15.9 mm under a nitrogen gas atmosphere, and pulverized at room temperature under 88 rpm for 72 hours. 17 g of the solid obtained were dispersed in 80 ml of a refined n-heptane and 7 ml of ethyl benzoate were added over about 5 minutes while stirring.

Thereafter the inner temperature was elevated to 80° C. and stirring was effected for 90 minutes. Next the dispersion was filtered and the resulting solid was washed three times with 50 ml of hot n-heptane.

The solid obtained was dispersed in 300 ml of $TiCl_4$, the temperature was elevated to 80° C., and stirring was effected for 120 minutes. The product thus treated was filtered while still hot and the resulting solid was washed four times with 50 ml of hot n-heptane and then, dried under reduced pressure at about 60° C. for 60 minutes.

The solid catalyst thus obtained had a titanium content of 3.70% by weight as metal titanium.

Polymerization 1200 ml of a dried, refined n-heptane, 0.68 millimols of Na[Al(C$_2$H$_5$)$_4$] and 350 mg of the powdery solid catalyst were charged under a nitrogen gas stream into a 3.0 l stainless steel autoclave which had been dried sufficiently and purged by nitrogen gas and the inner temperature was elevated to 65° C. Propylene was introduced till the internal pressure of 3 Kg/cm$^2$ while the inner temperature was maintained at 65° C., and polymerization was carried out for two hours. 30 ml of iso-propanol were added, the temperature was reduced to room temperature and the ramining propylene was removed. The contents of the autoclave were filtered off and dried under reduced pressure at 60° C. Thus 430 g of a white powdery polypropylene were obtained. On the other hand, the filtrate contained 8 g of a n-heptane soluble polymer.

A residue rate of extraction of powdery polypropylene by a boiling n-heptane (II) was 96.1%. An average polymerization activity per titanium of the catalytic component (KA) was 3380 g polymer/g.Ti.hr.Kg/cm$^2$. An intrinsic viscosity of the polymer (135° C., in Tetraline) was 3.42.

REFERENCE EXAMPLE 1

Pulverization was carried out for 72 hours in the same manner as in Example 1 except charging 52 g of anhydrous magnesium chloride only instead of magnesium chloride and iodine.

Using 17 g of the pulverization product obtained, a solid catalyst was obtained by the same manner as in Example 1. The Ti content in the solid catalyst was 3.12% by weight. Using this catalyst component with Na[Al(C$_2$H$_5$)$_4$], polymerization of propylene was carried out in the same procedure as in Example 1.

The conditions and results are set forth in Table 2.

REFERENCE EXAMPLE 2

Reference Example 1 was repeated except using 13.7 millimols of Al(C$_2$H$_5$)$_3$ as the organometallic compound.

EXAMPLES 2-5

Using the solid catalyst obtained in Example 1 and various organometallic compounds as indicated in Table 1, polymerization of propylene was carried out in the same procedure as in Example 1.

In Example 5 the organometallic compound was used in mixture with an electron donative compound.

EXAMPLE 6

A solid catalyst was obtained in the same manner as in Example 1 except using 7 g of MgI$_2$ instead of iodine. Ti Content: 3.23% by weight.

Using this catalytic component with Na[Al(C$_2$H$_5$)$_4$], polymerization of propylene was carried out in the same procedure as in Example 1.

EXAMPLE 7

A solid catalyst was obtained in the same manner as in Example 1 except using 7 g of MgBr$_2$ instead of iodine. Ti Content: 2.89% by weight.

Using this catalytic component with Na[Al(C$_2$H$_5$)$_4$], polymerization of propylene was carried out in the same procedure as in Example 1.

EXAMPLE 8

A solid catalyst was obtained in the same manner as in Example 1 except using 4 g of MgBr$_2$ and 3 g of iodine instead of iodine.

Using this catalytic component with Na[Al(C$_2$H$_5$)$_4$], polymerization was carried out in the same procedure as in Example 1.

EXAMPLES 9-10

A solid catalyst was obtained in the same manner as in Example 1 except using 7 g of IBr instead of iodine. Using this solid catalyst in combination with Na[Al(C$_2$H$_5$)$_4$] and Al(C$_2$H$_5$)$_3$, respectively, polymerization was carried out in the same procedure as in Example 1.

EXAMPLES 11-15

A solid catalyst was obtained in the same manner as in Example 1 except using 4 g of IBr and 3 g of iodine; 6 g of ICl; 4 g of ICl$_3$ and 3 g of iodine; 6 g of ICl$_3$; 6 g of Br$_2$, respectively instead of iodine as indicated in Table 1.

Using this solid catalyst with Na[Al(C$_2$H$_5$)$_4$], polymerization was carried out in the same procedure as in Example 1.

EXAMPLE 16

52 g of anhydrous magnesium chloride were charged to the ball mill pot of Example 1 and pulverized for 72 hours. 45 g of the pulverized magnesium chloride and 6 g of iodine were dispersed in 240 ml of a dried, refined carbon tetrachloride, elevated to 80° C. and stirred for 120 minutes. After cooling the dispersion was filtered to obtain solid powders. 17 g of the solid powders were dispersed in 80 ml of a dried n-heptane, followed by an ethyl benzoate treatment and a TiCl$_4$ treatment in the same manner as in Example 1. Using the solid catalyst thus obtained with Na[Al(C$_2$H$_5$)$_4$], polymerization was carried out in the same manner as in Example 1.

EXAMPLE 17

A solid catalyst was obtained in the same manner as in Example 16 except using 7 g of IBr instead of iodine and also 240 ml of a refined n-heptane instead of CCl$_4$. Using this catalyst with Na[Al(C$_2$H$_5$)$_4$], polymerization was carried out in the same procedure as in Example 1.

EXAMPLE 18

52 g of anhydrous magnesium chloride were charged into the ball mill pot of Example 1 and pulverized for 72 hours. 45 g of this powdery magnesium chloride and 6 g of iodine were charged into a stainless steel container of 40 mm in diameter and 120 ml in capacity under argon gas atmosphere, which was then sealed, placed in an oil bath of 220° C. and allowed to stand for 6 hours.

17 g of the product thus treated were subjected to an ethyl benzoate treatment and a TiCl$_4$ treatment in the same manner as in Example 1.

Using the catalyst thus obtained with Na[Al($C_2H_5$)$_4$], polymerization was carried out in the same manner as in Example 1.

EXAMPLE 19

Polymerization was carried out in the same procedure as in Example 1 except charging 350 ml of hydrogen simultaneously with propylene.

An intrinsic viscosity of the polymer obtained was 1.56 (135° C., in Tetraline).

EXAMPLE 20

Polymerization was carried out in the same procedure as in Example 1 except adding 50 g of ethylene divided in ten times during the polymerization of propylene.

EXAMPLE 21

In accordance with Example 1 polymerization was carried out and after 120 minutes propylene was removed. 2.7 millimols of Al($C_2H_5$)$_3$ were charged under a nitrogen gas stream and immediately, 50 g of ethylene were fed under a pressure of less than 5 Kg/cm$^2$.

After 5 minutes the polymerization was discontinued.

EXAMPLE 22

1200 ml of a dried, refined n-heptane, 1.2 millimols of Al($C_2H_5$)$_3$ and 50 mg of the solid catalyst of Example 9 were fed into the autoclave of Example 1 under a nitrogen gas stream and elevated to 65° C.

Hydrogen was fed till the inner pressure had reached 3 Kg/cm$^2$ and then, ethylene was fed till the partial pressure of 3 Kg/cm$^2$. Polymerization was carried out at the total pressure of 6 Kg/cm$^2$ and the inner temperature of 65° C. for two hours. Thereafter the post-treatments were carried out in the same manner as in Example 1.

REFERENCE EXAMPLE 3

45 g of anhydrous magnesium chloride and 13.5 ml of ethyl benzoate were charged into the ball mill pot of Example 1 and pulverized for 72 hours. 19.7 g of the pulverization product obtained were subjected to the TiCl$_3$ treatment followed by washing and drying in the same manner as in Example 1.

The solid catalyst thus obtained had a Ti content of 3.19% by weight.

Using this catalyst together with Al($C_2H_5$)$_3$ and ethyl benzoate, polymerization of propylene was carried out in the same manner as in Example 1. The results are set forth in Table 2.

REFERENCE EXAMPLE 4

Using the solid catalyst of Reference Example 3 and Na[Al($C_2H_5$)$_4$], polymerization of propylene was carried out in the same manner as in Example 1. The results are set forth in Table 2.

TABLE 1

| Ex. No. | Treating Agents* Type, Amount (g) | | Ti Content of Catalyst (%) | Amount of Catalyst (mg) | Organometallic Compound Type, Amount (m mol) | | Additives (m mol) | Yield of Total Polymer (g) | KA (g Polymer/ g Ti hr Kg/cm²) | Powdery Polymer II (%) | Total Polymer II (%) | Intrinsic Viscosity | Remarks |
|---|---|---|---|---|---|---|---|---|---|---|---|---|---|
| 1 | I₂ | 6 | 3.70 | 350 | Na[Al(C₂H₅)₄] | 0.68 | — | 438 | 5630 | 96.1 | 94.3 | 3.42 | |
| 2 | " | " | " | " | Ca[Al(C₂H₅)₃H]₂ | " | — | 417 | 5370 | 95.1 | 93.2 | — | |
| 3 | " | " | " | " | Ca[Al(OC₂H₅)(C₂H₅)₃]₂ | " | — | 442 | 5680 | 91.2 | 89.8 | — | |
| 4 | " | " | " | " | Ca[Al(C₂H₅)₃Cl]₂ | " | — | 414 | 5330 | 95.6 | 93.7 | — | |
| 5 | " | " | " | " | Al(C₂H₅)₃ | 49.0 | EB** 16.0 | 396 | 5100 | 92.8 | 90.6 | — | |
| 6 | MgI₂ | 7 | 3.23 | " | Na[Al(C₂H₅)₄] | 0.59 | — | 243 | 3580 | 90.9 | 88.7 | — | |
| 7 | MgBr₂ | 7 | 2.89 | " | " | 0.53 | — | 166 | 2730 | 92.1 | 90.1 | — | |
| 8 | MgBr₂ | 4; | 3.52 | " | " | 0.64 | — | 345 | 4670 | 94.3 | 92.8 | — | |
| 9 | I₂ | 3 | 3.65 | 150 | " | 0.29 | — | 278 | 8470 | 91.0 | 89.8 | — | |
| 10 | IBr | 7 | " | " | Al(C₂H₅)₃ | 21.0 | EB** 6.3 | 264 | 8050 | 89.8 | 86.6 | — | |
| 11 | I₂ | 3; | 3.91 | " | Na[Al(C₂H₅)₄] | 0.31 | — | 302 | 8580 | 92.2 | 90.1 | — | |
| 12 | IBr | 4 | 3.84 | 150 | " | 0.30 | — | 290 | 8400 | 93.9 | 92.4 | — | |
| 13 | ICl | 6 | 3.86 | 350 | " | 0.71 | — | 411 | 5070 | 93.9 | 92.5 | — | |
| 14 | ICl₃ | 3; | 3.57 | " | " | 0.65 | — | 435 | 5800 | 92.3 | 91.2 | — | |
| 15 | ICl₃ | 6 | 3.92 | " | " | 0.72 | — | 322 | 3920 | 92.5 | 91.9 | — | |
| 16 | Br₂ | 6 | 3.48 | " | " | 0.64 | — | 268 | 3670 | 93.6 | 90.9 | — | |
| 17 | I₂ | 7 | 3.80 | " | " | 0.69 | — | 364 | 4570 | 90.1 | 88.1 | — | |
| 18 | IBr | 6 | 3.95 | " | " | 0.72 | — | 466 | 5620 | 92.9 | 91.5 | — | |
| 19 | I₂ | 6 | 3.70 | " | " | 0.68 | — | 412 | 5300 | 94.7 | 93.0 | — | |
| 20 | " | " | " | " | " | 0.68 | — | 473 | 6080 | 92.8 | 90.9 | 1.56 | Addition of H₂ |
| 21 | " | " | " | " | Al(C₂H₅)₃ | 2.7 | — | 479 | — | 92.0 | 91.5 | — | Addition of C₂H₄ in parts Post-addition of C₂H₄ |
| 22 | IBr | 7 | 3.65 | 50 | " | 1.2 | — | 420 | 37800 | — | — | — | Polymerization of Ethylene |

*An amount of treating agents is based on 45 g of magnesium halide.
**Ethyl benzoate

TABLE 2

| Ref. Ex. No. | Treating Agents | Ti Content of Catalyst (%) | Amount of Catalyst (mg) | Organometallic Compound Type, Amount (m mol) | | Additives (m mol) | Yield of Total Polymer (g) | KA (g Polymer/ g Ti Hr. Kg/cm$^2$) | Powdery Polymer II (%) | Total Polymer II (%) |
|---|---|---|---|---|---|---|---|---|---|---|
| 1 | Non | 3.12 | 700 | Na[Al(C$_2$H$_5$)$_4$] | 1.14 | — | 74 | 570 | 86.4 | 80.9 |
| 2 | Non | " | " | Al(C$_2$H$_5$)$_3$ | 13.7 | — | 155 | 1180 | 68.9 | 51.4 |
| 3 | Non | 3.19 | 350 | Al(C$_2$H$_5$)$_3$ | 62.9 | EB* 20.0 | 243 | 3630 | 88.2 | 86.0 |
| 4 | Non | " | " | Na[Al(C$_2$H$_5$)$_4$] | 0.58 | — | 264 | 3940 | 89.8 | 87.8 |

*Ethyl benzoate

What is claimed is:

1. A catalytic component for polymerization of olefins prepared by intimately contacting magnesium halide as a substrate with at least one member selected from the group of halogen, magnesium halide and an interhalogen compound represented by the following formula, the halogen atoms of which are different from the halogen atom of magnesium halide as the substrate and further intimately contacting the resulting product with an electron donative compound and a halogen-containing titanium compound where halogen is directly attached to titanium:

$$XY_n$$

wherein X and Y are different halogen atoms and n is a number of 1, 3, 5 or 7.

2. The catalytic component of claim 1 wherein the magnesium halide as the substrate is selected from the group of MgCl$_2$, MgBr$_2$ and MgI$_2$.

3. The catalytic component of claim 1 wherein said halogen as the treating agent is Cl$_2$, Br$_2$ or I$_2$.

4. The catalytic component of claim 1 wherein said magnesium halide as the treating agent is MgCl$_2$, MgClBr, MgClI, MgBr$_2$, MgBrI or MgI$_2$.

5. The catalytic component of claim 1 wherein said interhalogen compound is ClF, BrF, IF, BrCl, ICl, IBr, BrF$_3$, IF$_3$, ICl$_3$, BrF$_5$, IF$_5$ or IF$_7$.

6. The catalytic component of claim 1 wherein said electron donative compound is an aromatic carboxylic acid ester.

7. A catalytic system for polymerization of olefins which comprises the catalytic component of claim 1 and an organometallic compound containing a metal of Groups 1, 2 or 3 of the Periodic Table.

8. The catalytic component of claim 1, wherein: the mole ratio of magnesium halide to at least one member of said group is 1:0.01-5;
   the electron donative compound is used in an amount of 0.1-2000 millimols per 1.0 gram atom of Mg of the magnesium halide; and
   the titanium compound is used in an amount of 0.1 milligram atom-30 gram atoms based on 1.0 gram atom of mg of the magesium halide.

9. The catalytic component of claim 8, wherein:
   the magnesium halide is contacted with the at least one member from the group for between 3 minutes and 300 hours at −78° to 500° C., the contact with the electron donative compound is for between 3 minutes and 300 hours at −20° to 150° C. and the contact with the titanium compound is for between 3 minutes and 300 hours at −20° to 200° C.

10. The catalytic component of claim 9 wherein said magnesium halide as a substrate is intimately contacted with said at least one member from said group by pulverizing the same together, by contacting powdered magnesium halide with said at least one member from said group in a solvent or by contacting powdered magnesium halide with said at least one member from said group in the vapor phase.

11. The catalytic component of claim 10 wherein contact with the electron donative compound is effected in an inert solvent.

12. The catalytic component of claim 11 wherein contact with the titanium compound is effected in the liquid or vapor phase.

* * * * *